Aug. 2, 1955    R. F. REDEMSKE    2,714,309
MEANS FOR OBTAINING FLIGHT DATA
Filed Aug. 28, 1951    4 Sheets-Sheet 2

INVENTOR.
RALPH F. REDEMSKE
BY
Eyre, Mann & Burrows
ATTORNEYS.

INVENTOR.
RALPH F. REDEMSKE

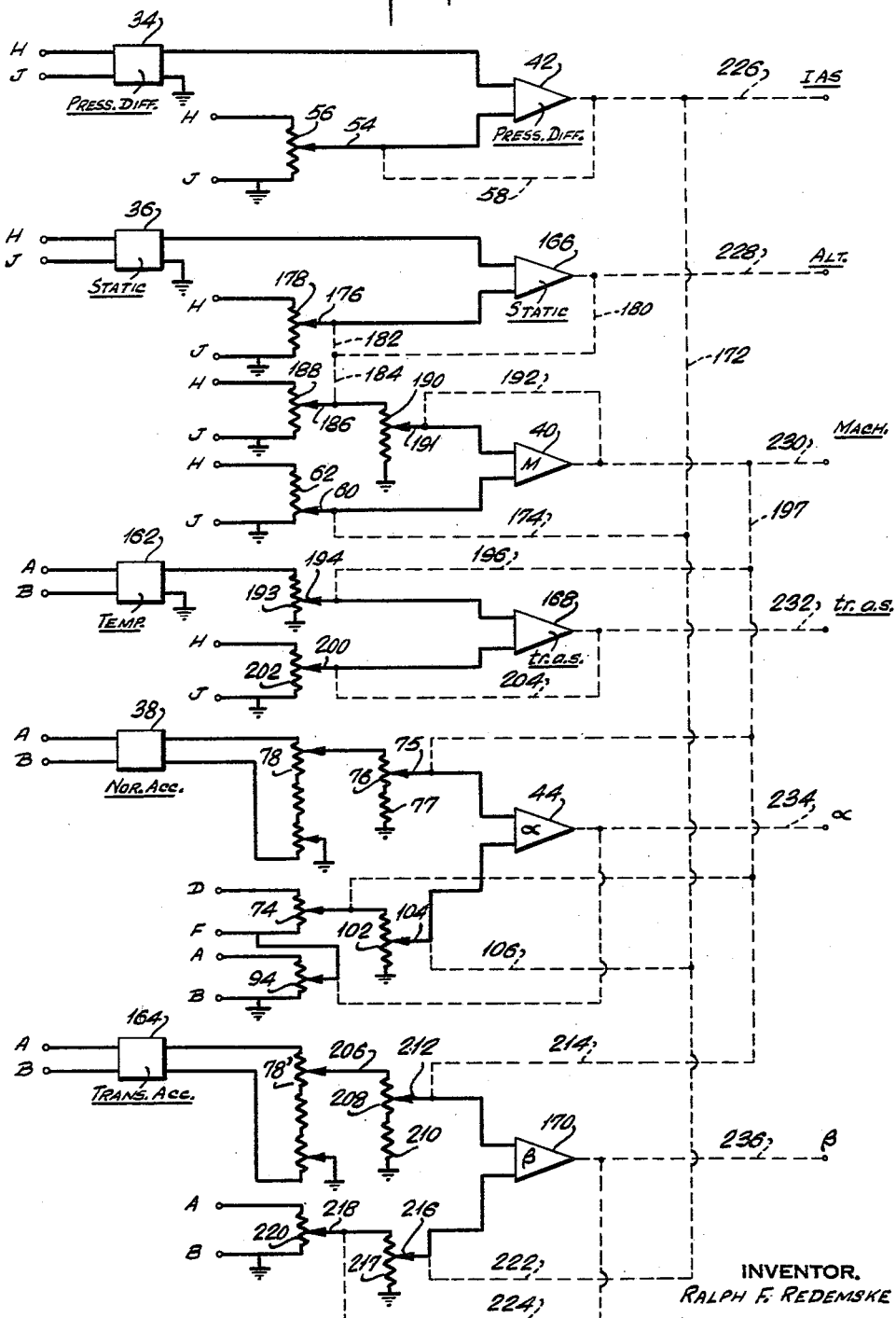

United States Patent Office 2,714,309
Patented Aug. 2, 1955

2,714,309

MEANS FOR OBTAINING FLIGHT DATA

Ralph F. Redemske, Huntington Bay Hills, N. Y., assignor to Servomechanisms, Inc., Westbury, N. Y., a corporation of New York Application August 28, 1851, Serial No. 244,073

11 Claims. (Cl. 73—178)

This invention relates to an apparatus for electromechanically obtaining flight data from a plurality of measurable quantities. With the advent of high speed military aircraft and the present trends toward the development of aircraft traveling at supersonic speeds, it has become increasingly desirable that flight data, such as Mach number, pressure altitude, angle of attack, etc., be made continuously available.

The system of the invention operates on fundamental information readily available in an aircraft. It requires no external protuberances not already necessary for operation of elementary navigational instrumentation. Equipment embodying the invention is rugged, easy to install and to maintain, compact and reliable in operation. In the preferred embodiment of the invention, the equipment is composed of a plurality of interconnected separately packaged units, all but one of which are independent of the structure or design of the aircraft.

The invention will be described with particular reference to its applicability to the solution of the aerodynamic equation involving angle of attack. This for the reasons that substantially all desired flight data are, or readily can be, automatically made available by the system of the invention simultaneously with the yielding of the angle of attack and because continuous information of the instantaneous angle of attack of an aircraft is extremely important in a number of applications in advanced military aircraft. This information is essential in the fire control system employed with air-to-air rocket firing. Also this information is vitally important in the tempering of blind landing systems in both military and commercial operations. Various aerodynamic equations have been developed which when solved yield the angle of attack. These equations include terms which are functions of the normal acceleration of the aircraft, of the ratio of aircraft weight, including load, to wing area, and of the instantaneous relative speed of the aircraft. The computing system of the present invention solves such equations and is the first, it is believed, that does not require the manual introduction from time to time of information needed for obtaining the solution.

The system, in addition to yielding an output signal indicative of the angle of attack, is adapted to yield additional important flight data, such as instantaneous air speed, altitude, Mach number, true air speed and angle of yaw. The system also permits of the introduction into the equation for the angle of attack of a term which compensates for aeroelastic twist of the wing section of aircraft having swept-back wings. As this twist effectively changes the angle of attack for zero lift of the aircraft, the inclusion of the compensating term in the aerodynamic equation is of substantial importance.

For a better understanding of the invention, reference may be had to the accompanying drawings, of which—

Fig. 5 is a schematic diagram of a system representing another embodiment of the invention.

Figure 1:
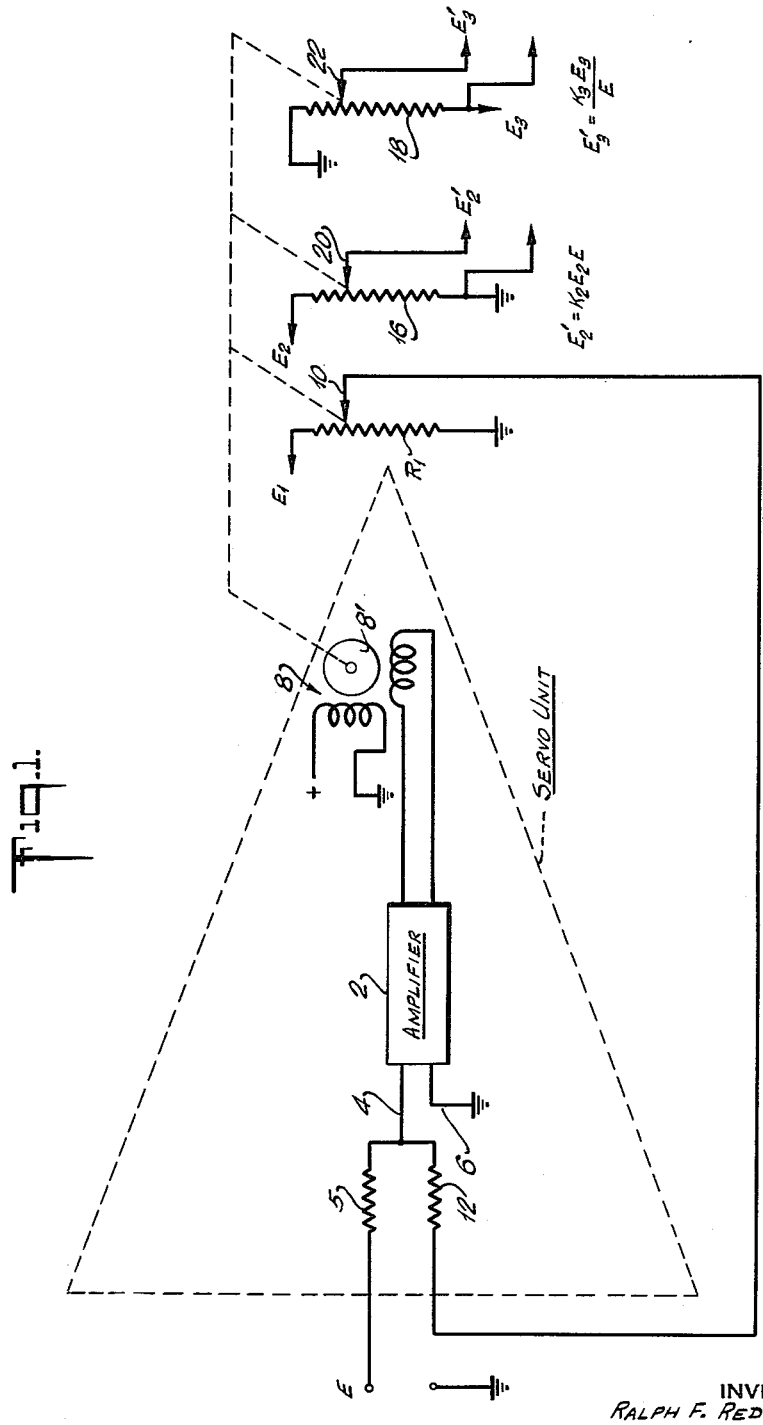
Fig. 1 is a diagram explanatory of the fundamental servo unit employed in the computing system of the invention.

The fundamental unit of the new computing system can best be understood from Fig. 1, to which reference may now be had. This unit includes an amplifier 2 having two input terminals 4 and 6, the latter of which is grounded, and a reversible motor 8 controlled by the output from the amplifier 2. An input signal, indicated as a voltage E, is impressed upon input terminal 4 through a resistor 5. A potentiometer comprising a resistor $R_1$ across which a constant potential $E_1$ is impressed, has the position of the wiper 10 thereon controlled by a rotor 8' of motor 8 and this wiper 10 is connected through a resistor 12 to input terminal 4 of the amplifier 2 to provide a voltage to be compared with, and equated to, the signal voltage E. When the voltages to be compared are alternating voltages the amplifier 2 may be any conventional amplifier for comparing the two voltages impressed upon the input terminal and for energizing the motor 8 upon unbalance of these voltages in a direction to restore balance. If the voltages E and $E_1$ are derived from D. C. sources, a suitable vibrator or chopper can be included with the amplifier unit as will be well understood in the art. For example, in the case of D. C. voltages, the modulator circuit disclosed and claimed in the pending application of Samuel Feinstein, Serial No. 202,490, filed December 23, 1950, now U. S. Patent No. 2,642,544 dated June 16, 1953; or that disclosed and claimed in the pending application of George M. Attura, Serial No. 118,968, filed September 30, 1949, now U. S. Patent No. 2,687,503 dated August 24, 1954, could be employed. With the above described arrangement, the angular position of the rotor 8' of motor 8 will depend solely upon the magnitude of E, the input signal, and hence if the position of the wiper of another potentiometer across which a variable voltage is impressed is controlled by the rotor 8', an output voltage varying directly with such second varying voltage and either directly or inversely with the signal E may be obtained. Two such additional potentiometers are indicated at 16 and 18 in Fig. 1. A variable voltage $E_2$ is impressed across potentiometer 16 and a variable voltage $E_3$ is impressed across potentiometer 18. The mechanical coupling between the shaft of rotor 8' and the wipers of the potentiometers $R_1$, 16 and 18 is indicated symbolically in Fig. 1 by dashed lines. It will be understood, however, that in any physical embodiment the potentiometers are disposed in arcuate form about the same or different shafts, that such shaft or shafts are driven from the shaft of rotor 8' through multiplying or reducing gear sets which may include reversing gears, and that the wipers are rotated by such shaft or shafts. In Fig. 1 wiper 20 on potentiometer 16 is assumed to be so coupled to rotor 8' that its potential $E'_2$ with respect to the grounded end of resistor 16 increases with increase in the bucking potential applied through resistor 12 to the amplifier from wiper 10 on potentiometer $R_1$, whereas wiper 22 on potentiometer 18 is assumed to be oppositely coupled to rotor 8' so that its potential $E'_3$ with respect to the grounded end of resistor 18 decreases with increase in the bucking potential. This arrangement is indicated in Fig. 1 by the grounding of the lower ends of potentiometers $R_1$ and 16 and the grounding of the upper end of potentiometer 18. Thus with voltage $E_1$ constant, when the signal voltage E increases, rotor 8' will move wipers 10, 20 and 22, increasing the potential of wipers 10 and 20 and decreasing that of wiper 22 of potentiometer 18 until the bucking potential of wiper 10 equals that of the signal E. The output potential $E_2'$ at wiper 20 of potentiometer 16 will thus be varied directly with E and the output potential $E_3'$ at wiper 22 of potentiometer 18 will be varied inversely with E. Output $E_2'$ varies also with $E_2$ and hence is equal, as indicated in Fig. 1 to $K_2 E_2 E$ where $K_2$ is a constant or a function of the construction of resistor 16 if that resistor is not so made that equal increments correspond to equal displacements of the wiper thereon. Output potential $E_3'$ varies directly with $E_3$ and hence, as indicated in Fig. 1, is equal to $$\frac{K_3 E_3}{E}$$

where $K_3$ is a constant or a function of the construction of resistor 18.

The computing system of the invention employs a number of fundamental units of the general type of that just described with reference to Fig. 1. The following gives an indication of the utility of the simple system of Fig. 1. Assume it is desired to indicate on an aircraft the instantaneous Mach number, that is, the ratio of the instantaneous relative speed of the aircraft to the velocity of sound. Mach number is a function of the ratio of the difference between the total and static pressures to the static pressure acting on the aircraft. From transducers on the aircraft capable of transforming pressure to electrical signals, a voltage E varying with the static pressure can be obtained and a voltage $E_3$ varying with the difference between the total and static pressures can be obtained. $E_3'$ will then be proportional to Mach number. Other applications of the unit of Fig. 1 will become apparent as the description proceeds.

Figure 2:
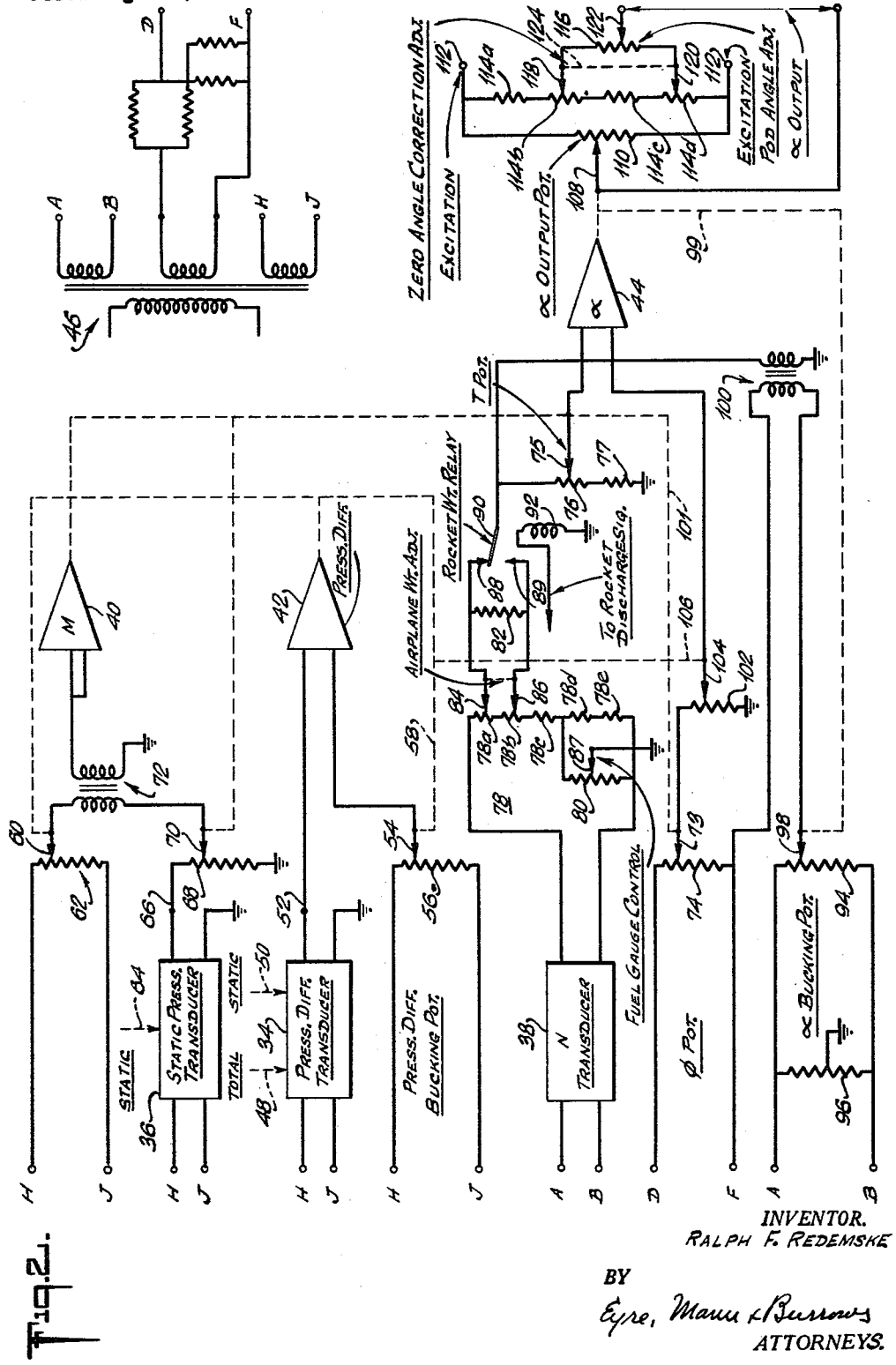
Fig. 2 is a schematic diagram showing one embodiment of the angle of attack computer of the invention.
Figure 3:
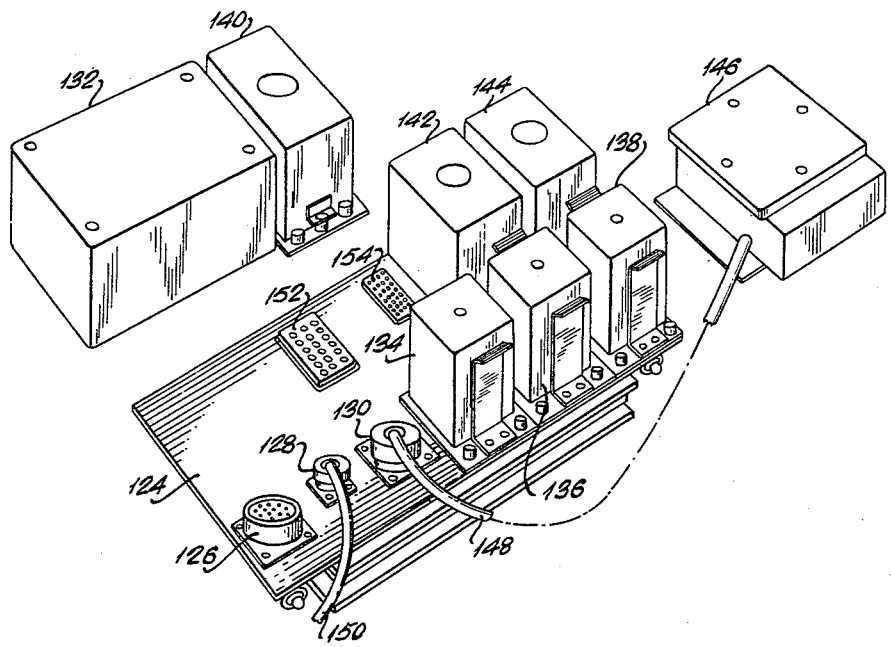
Fig. 3 is a perspective view illustrating one physical embodiment of the computer system diagrammatically shown in Fig. 2.

The foregoing description will assist in an understanding of the esystem of Fig. 2 which is specifically arranged to solve an aerodynamic expression for the angle of attack of an aircraft. The particular equation which is solved by the system of Fig. 3 is the following:

$$\alpha = \frac{NWT}{QcS} + \phi + \frac{NWK}{S}$$

where $\alpha$ is angle of attack, in degrees, between fuselage reference line and free air stream.
N is acceleration normal to fuselage reference line in G's.
W is weight of aircraft including loading in pounds.
T and $\phi$ are empirical functions of Mach no.
Qc is difference between total and static pressures.
S is wing area in equare feet and K is a constant determined by the configuration of the wings in swept-back wing aircraft.

Figure 4:
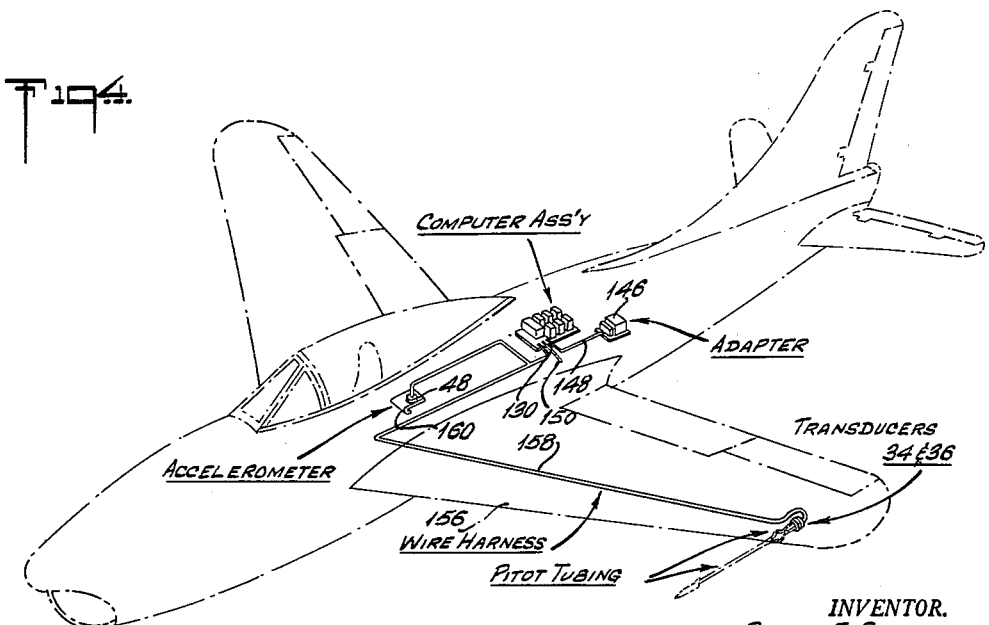
Fig. 4 is a perspective view indicating suggested location in an aircraft of the computer system of Figs. 2 and 3.

In the simplified diagram of Fig. 2 no attempt has been made to illustrate the physical construction of the devices delivering the input information to the computer nor to indicate any specific grouping or location of the units of the computer and of the transducers. Transducers for delivering a direct or an alternating voltage varying with a pressure, or with a pressure differential and accelerometers are known instruments and form no part of the present invention. Fig. 4, to which reference will be made thereinafter, illustrates a typical installation on an airplane of the computer of Fig. 2 and of the transducers thereof.

The system of Fig. 2 includes three transducers, the pressure differential transducer 34, the static pressure transducer 36 and the N transducer or accelerometer 38 and three servo units, the Mach number of M servo 40, the pressure differential servo 42 and the angle of attack servo 44. The servo units 40, 42 and 44 are represented symbolically in Fig. 2 as triangles. It will be understood that each unit includes an amplifier and motor, as described in connection with Fig. 1. The system of Fig. 2 also includes various potentiometers hereinafter identified in connection with the description of their functions and a supply transformer 46 having three secondaries the output terminals of which are identified by the letters A—B, D—F and H—J, respectively. An alternating voltage of say 115 volts is impressed across the primary of the supply transformer from the electrical installation on the aircraft. The transformer 46 forms part of the power supply unit shown in Figs. 3 and 4, which unit includes in addition to the transformer 46 means for furnishing the plate and heater voltages for the servo amplifiers and a central fusing arrangement for the system. These parts, being conventional, are not illustrated in the drawings.

The pressure differential transducer 34 which is excited by the voltage appearing across secondary terminals H—J of transformer 46 delivers an output alternating voltage across its output terminals which varies with the difference between the indicated total and static pressures acting on the aircraft. The controlling influence of these pressures on the transducer output is indicated symbolically by the dashed arrows 48 and 50 associated with the notations "Total" and "Static" respectively. The ungrounded output terminal 52 and the wiper 54 of a bucking potentiometer 56 connected across the terminals H—J are connected to the pressure differential servo 42 which adjusts the position of wiper 54, as indicated by the dashed line 58, to bring the input voltages to equality. Servo 42 also controls a wiper 60 on a second potentiometer 62 connected across the terminals H—J. The static pressure transducer 36, which is also excited by voltage from secondary terminals H—J, delivers an output voltage which varies with the indicated static pressure acting on the aircraft, as symbolically indicated in the drawing by the dashed arrow 64 and the notation "Static" associated therewith. The ungrounded output terminal 66 is connected through a resistor 68 to ground and a wiper 70 on resistor 68 is connected through the primary winding of a transformer 72 to wiper 60 on potentiometer 62. The secondary winding of transformer 72 is grounded at one end and connected at its other end to the input terminals of servo 40, the output of which controls the position of wiper 70 to bring the potential at wiper 70 equal to that at wiper 60. Thus servo 40 responds oppositely to like changes in pressure differential and static pressure and therefore the position of its output shaft depends upon the ratio of these forces, which, as heretofore indicated, is a measure of Mach number. Servo 40 also controls the position of a wiper 73 on a potentiometer 74 indicated as "$\phi$ Pot" in the drawing, across which is impressed a voltage from secondary terminals D—F of the transformer and the position of a wiper 75 on a potentiometer 76 indicated as "T Pot." Potentiometers 74 and 76 will be hereinafter described in more detail.

N transducer 38 is excited by voltage from secondary terminals A—B and delivers across a resistance network 78 a voltage varying with the acceleration of the plane normal to the fuselage reference line. The resistors forming the network 78 are selected in accordance with the ratio of the weight of the plane and its loading to the area S of the wings. The network comprises five resistors, 78a, 78b, 78c, 78d, 78e connected in series across the N transducer output, a resistor 80 bridged across resistors 78d and 78e, and a resistor 82 with the ends of which are connected to adjustable taps 84 and 86 on resistors 78a and 78b respectively. Resistor 80 is provided with a wiper 87 that is connected to ground, and means (not shown) are provided for adjusting the position of wiper 87 from the fuel gauge, to reduce the resistance of the network 78 with decrease in weight of fuel. The position of taps 84 and 86 is adjusted when the system is initially installed to accommodate the system to crafts of different weight and fixed loading. A pair of fixed contacts 88 and 89, which are connected to the opposite ends of resistor 82, are adapted to be engaged by the armature 90 of a relay 92, contact 89 being engaged by the armature when the relay is energized and contact 88 being engaged when the relay is deenergized. Relay 92 is connected in circuit with the rocket firing mechanism of the aircraft so as to be energized after a number of rockets, sufficient to make a significant difference in the load of the aircraft, have been discharged. One end of T potentiometer 76 is connected to armature 90 and the other end is connected through a fixed resistor 77 to ground.

As heretofore indicated in connection with the aerodynamic equation for the angle of attack solved by the particular computer system diagrammatically illustrated in Fig. 2, T is a function of Mach number M. It is a term introduced into the aerodynamic equation to provide for correction for errors introduced by the Pitot static system of the aircraft at high speeds, that is to convert indicated pressures and pressure differentials to true pressures and pressure differentials. These errors may be substantial at high Mach number but are ordinarily negligible or non-existant at low aircraft speeds. Accordingly, resistor 76 is so designed that the change in total resistance between the wiper 75 and ground for a given displacement of the wiper will be large when M is large. At low speeds, that is low Mach number, the wiper 75 runs off resistor 76 so that the resistance between the wiper and ground remains fixed at the value of resistor 77.

Thus, by proper selection of the resistance values of the network 78 connected to the N transducer and proper construction of potentiometer 76, a voltage is applied to one input terminal of servo 44 from wiper 75 which is proportional to $NWT/S$.

The bucking potential to be applied to servo 44 is obtained from the elements now to be described. A potentiometer 94 is connected across the secondary terminals A—B, as is also a center grounded resistor 96. The wiper 98 on potentiometer 94 is controlled by servo 44, as indicated by the dashed line 99. This wiper 98 is connected to terminal F of the $\phi$ potentiometer 74 through the secondary of a stepdown transformer 100, the primary of which is connected between armature 90 of the rocket weight relay and ground. The wiper 73 of the $\phi$ potentiometer, the position of which is controlled by servo 40 as indicated by the dashed line 101, is connected through a resistor 102 to ground. A wiper 104 on resistor 102, controlled by servo 42, as indicated by the dashed line 106, is connected to the other input terminal of servo 44. The transformer 100 introduces into the circuit the term $$\frac{KNW}{S}$$

being the correction for the aeroelastic deformation of the wings of a swept-back winged plane at high speeds. As the primary is connected to the output of the $$\frac{NW}{S}$$

network 78, the number of turns of the primary and secondary of this transformer can be so selected as to provide the proper decrement to the bucking potential to be applied to the angle of attack servo. The term $\phi$ is introduced into the aerodynamic equation to correct for angle of attack at zero lift. Like T, the term $\phi$ is not a linear function of M and therefore resistance 74 is suitably tapered to yield an output voltage between the wiper 73 and terminal F which varies in the desired manner with M. Thus the voltage with respect to ground appearing at wiper 73 will vary with that appearing at wiper 98 of the bucking potential 94, less $$\frac{KNW}{S}$$

introduced by transformer 100 less $\phi$, whereas the voltage at wiper 104 on potentiometer 102 will vary with the product of the pressure differential and the above indicated difference. Thus at one input terminal to servo 44 there is impressed a voltage corresponding to $$\frac{NWT}{S}$$

and at the other input terminal to the servo there is impressed a voltage corresponding to $$\left(X-\frac{KNW}{S}-\phi\right)Qc$$

where X is the voltage at wiper 98. Servo 44 operates to adjust X until these two input voltages are equal, at which time, from the aerodynamic equation originally specified, it follows that $X=\alpha$. The position of the shaft of servo 44 therefore corresponds to the solution of the equation for the angle of attack.

In the particular computer shown in Fig. 2, the shaft position of servo 44 is utilized to yield an electrical output signal from a circuit now to be described. The servo controls the position of a wiper 108 on a potentiometer 110 connected across terminals 112 of a source of excitation voltage (not shown). Four resistors, 114a, 114b, 114c and 114d are connected in series across the terminals 112 and a resistor 116 is connected at one end to an adjustable tap 118 on resistor 114b and at its other end to an adjustable tap 120 on resistor 114d. The output signal appears across the wiper 108 on potentiometer 110 and a tap 122 on resistor 116. The purpose of the above described network is to permit of adjustment of the system during installation in an aircraft to compensate for difference in design and construction of aircraft. Taps 118 and 120 are ordinarily ganged together, as indicated by the dashed line 124, and positioned to compensate for differences in zero lift angle of the aircraft, whereas tap 122 is adjusted to compensate for different fixed angles of the rocket pods.

As the operation of the system of Fig. 2 has been described in connection with the identification of the various elements thereof, a separate description thereof is not deemed necessary.

The system of Fig. 2 is packaged in units which are conveniently assembled on one or more shock-proofedly installed platforms containing the wiring for interconnecting the various units. In Fig. 3 one physical embodiment of the system is disclosed as comprising a base 124 which carries three terminal connectors 126, 128 and 130; the power supply unit 132, three amplifier units 134, 136 and 138, and three positioners 140, 142 and 144 associated, respectively, with units 134, 136 and 138. A separately mounted unit, an adapter unit 146, is shown in Fig. 3 separated from the parts carried by the platform 124 but electrically connected to connector 130 by a cable 148. The power supply 132 includes the transformer 46, the fusing for the system and a suitable rectifier and filter for delivering operating voltages to the amplifier units. This power supply can be of conventional construction and therefore has not been diagrammatically illustrated in the drawings. Excitation voltages from the electrical system of the aircraft for energizing power supply 132 and the output potentiometer 110 are delivered to the computer through a cable 150 plugged into connector 128. Amplifier 134 forms part of servo 40 and accordingly the positioner 140 associated with amplifier 134 contains the motor and shaft of that servo together with potentiometers 68, 76 and 74, the wipers of which are adjusted by servo 40. Amplifier 136 is the amplifier for servo 42 and accordingly positioner 142 associated therewith includes the motor and shaft of that servo, together with potentiometers 56, 102 and 62, the wipers of which are controlled by servo 42. Amplifier 138 forms part of servo 44 and hence positioner 144 associated therewith includes the motor and shaft of that servo together with potentiometers 94 and 110, the wipers of which are controlled by servo 44. Also within the positioner 144 is the transformer 100 for introducing into the equation compensation for aeroelastic deformation of the wings. All those parts of the system which include constants determined by the particular construction or weight of aircraft are enclosed within the adapter unit 146. These parts include the network 78 and the network associated in Fig. 2 with the output potentiometer 110. Also within the adapter unit is the rocket release relay and contacts controlled thereby. The wiring interconnecting the amplifiers, power supply and the elements within the positioners, is located on the lower side of the platform 124 and cooperating plug-in connections on the under surface of the separate units and on the upper surface of platform 124 serve to connect each unit into its appropriate circuit. In Fig. 3 the power supply unit 132 and positioner 140 are shown removed from the platform 124 in order to disclose the terminal strips conveniently utilized for making these connections. The strip 152 includes one-half of the connector for the power supply and the strip 154 includes one-half of the connector for positioner 140, the other halves of the respective connectors being in the bases of the units.

Fig. 4 illustrates suggested locations in an aircraft of the various units of the system of Figs. 2 and 3. Adjacent the tip of a wing 156 of the aircraft indicated in outline in the drawing are the conventional Pitot tubes and associated therewith are the transducers 34 and 36. These transducers are connected with terminal connector 126 by means of a cable 158, the leads to and from the accelerometer 43 being also included in the cable 158. The accelerometer is mounted on an adjustable mount 160 substantially at the center of gravity of the airplane and oriented to be responsive to acceleration normal to the fuselage reference line. The adapter can be mounted at any convenient spot in the plane and connected as heretofore indicated by the cable 148 to socket 130.

The computer system of Figs. 2 to 4, in addition to yielding a shaft rotation and an output signal corresponding to angle of attack, can be readily adapted to yield additional flight data. Indicated air speed, IAS, is squal to the square of the differences between indicated total and static pressures. Hence the shaft to servo 42 could be coupled directly or through gearing to the needle of an air speed indicator. Similarly, the shaft of servo 40 could be utilized to indicate M number. The system can be readily extended to yield additional flight data as indicated by the diagram of Fig. 5 to which reference may now be had.

Fig. 5 illustrates schematically a computing system embodying the invention which yields, in terms of shaft rotation, the folllowing data—angle of attack, angle of yaw, true air speed, Mach number, altitude and indicated air speed. Many units of Fig. 5 correspond to units of the diagram of Fig. 2 and are therefore identified by like reference numbers. These units are the differential and static pressure transducers 34 and 36, respectively, the N transducer 38 yielding a voltage varying with the acceleration of the aircraft normal to the fuselage reference line, the Mach number, pressure differential and angle of attack servo units 40, 42 and 44 respectively, and various potentiometers associated with these units. Energy for exciting the transducers and bucking potentiometers is obtained from secondary windings of a transformer such as transformers 46 of Fig. 2 and accordingly the identifying letters associated with the various input terminals in Fig. 5 correspond with like lettered output terminals of the transformers 46 of Fig. 2. Two transducers and three servo units in addition to those of the system of Fig. 2 are provided. Transducer 162, energized from terminals A—B, delivers an output voltage varying with the temperature of the air stream. Transducer 164, also energized from terminals A—B, delivers an output voltage varying with the transverse acceleration of the aircraft. Servo unit 166 is the static pressure servo for yielding an indication of altitude and for contributing to the input of Mach number servo 40. Servos 168 and 170, yielding, respectively, true air speed and angle of yaw, will be presently described.

The input circuit of servo 42 has been described with reference to Fig. 2. Its output shaft is mechanically coupled, as indicated by dashed lines 172 and 174, to wiper 60 of potentiometer 62 in the input circuit of servo 40. The input to servo 166 is connected to the output of transducer 36 and to a wiper 176 on a bucking potentiometer 178 energizel from terminals H—J. Wiper 176 is controlled by the shaft of servo 166, as indicated by the dashed lines 180 and 182. Servo 166 also controls, as indicated by dashed lines 180 and 184, a wiper 186 of a potentiometer 188 connected across terminals H—J. Wiper 186 is connected to ground through a potentiometer 190 the movable wiper 191 of which is controlled by servo 40, as indicated by the dashed line 192, and is electrically connected to the input of that servo as is also wiper 60 of potentiometer 62. The output of transducer 162 is connected to ground through a potentiometer resistor 193 the wiper 194 of which is controlled by servo 40, as indicated by dashed lines 196 and 197. Wiper 194 is connected to servo 168 as is also a wiper 200 on a bucking potentiometer 202 energized from terminals H—J. Wiper 200 is controlled by servo 168 as indicated by the dashed line 204.

The input to the angle of attack servo 44 needs only brief mention as it is the same as in the system of Fig. 2 except for omission of the rocket weight relay 90—92 and of the transformer 100 for inserting in the equation a term correcting for aeroelastic deformation of swept-back wings of an aircraft. When the weight of the rockets is small compared to the weight of the aircraft and its fixed loading, the relay is not needed and when the wing formation is such that there is little deformation, a sufficient correction therefor may be incorporated in the design of the T potentiometer 76.

The output of the transverse accelerometer or transducer 164 is connected across a network 78' which, like network 78, represents the ratio of the weight of the airplane to the surface area of the wings. An adjustable tap 206 on this network is connected to ground through a potentiometer 208 and resistor 210. Potentiometer 208, through its wiper 212 controlled by servo 40 as indicated by dashed lines 197 and 214, introduces into the equation for the angle of yaw a term T', corresponding to T in the equation for angle of attack. Wiper 212 is connected to one input terminal of the angle of yaw servo 170, the other terminal of which is connected to a wiper 216 on a potentiometer 217 grounded at one end and connected at its other end to wiper 218 of an angle of yaw bucking potentiometer 220. Wiper 216 is controlled by pressure differential servo 42 as indicated by dashed lines 172 and 222 and wiper 218 is controlled by servo 170 as indicated by dashed line 224.

With the above described system six flight data are made available in terms of shaft rotations. The shaft position of servo 42 yields indicated air speed, as symbolized my the letters IAS associated with the dashed line 226 connected to servo 42. The shaft position of servo 166 yields altitude as symbolized by the notation ALT associated with the dashed line 228 connected to servo 166. The shaft position of servo 40 yields Mach number as indicated by the term MACH associated with the dashed line 230 connected to servo 40. That the shaft rotation of servo 40 corresponds with Mach number will be readily apparent from inspection of the input circuit of that servo. The voltage across potentiometer 190 is a measure of the static pressure because its ungrounded end connected to wiper 186 is controlled by the static pressure servo 166. Thus when the shaft of servo 40 has come to rest, the voltage appearing at wiper 60, which is a measure of the pressure differential as wiper 60 is controlled by servo 42, is equal to some percentage, $p$, of the static pressure. The percentage, $p$, which is a measure of shaft displacement of servo 40, is thus equal to the pressure differential divided by the static pressure, or in other words, equal to Mach number.

The shaft position of servo 168 is an indication of true air speed as symbolized by the letters tr. a. s. associated with the dashed line 232 connected to servo 168. True air speed is related to temperature and Mach number by the equation—

$$(\text{tr. a. s.})^2 = CteM^2$$

where C is a constant, $te$ the temperature and M is Mach number. Thus, in order to make the output of servo 168 an indication of true air speed, potentiometer 193, the wiper 194 of which is controlled by M servo 40, is tapered to provide the term $M^2$ and the bucking potentiometer 202 is similarly tapered to introduce $(\text{tr. a. s.})^2$. The voltage across potentiometer 193, being that of the output of the temperature transducer 162, will vary with $te$ and that between ground and wiper 194 is accordingly proportional to $teM^2$. Thus, when the shaft of servo 168 has come to rest, its position is indicative of true air speed.

The position of the shaft of servo 44 is a measure of the angle of attack as symbolized by the Greek letter $\alpha$ associated with the dashed line 234 connected to servo 44. The input circuit of servo 44 has been previously described.

The position of the shaft of servo 170 is indicative of the angle of yaw as symbolized by the Greek letter $\beta$ associated with the dashed line 236 connected to servo 170. The equation for the angle of yaw, $\beta$ is similar to that for the angle of attack, $\alpha$, except that it includes no term corresponding to $\phi$. The equation may be written—

$$\beta = \frac{T'N\beta W/S}{Qc}$$

Where $N\beta$ is the transverse acceleration, T' is an empirical function of Mach number and $Qc$ is the pressure differential. As network 78', proportional to $W/S$, is connected across the output of transducer 164, the voltage across potentiometer 208 and resistor 210 will vary with $N\beta W/S$ and the input from wiper 212 to servo 170 will vary with the product of T' and $N\beta W/S$. The other input to servo 170 will vary with the product of the voltage at wiper 218 of bucking potentiometer 220 and $Qc$ from wiper 216 on potentiometer 217. When the inputs are equal the position of wiper 218, and therefore also of the shaft of servo 170, must correspond with $\beta$, the angle of yaw.

The above described shaft rotations, indicative of flight data, could of course be readily converted to electrical signals for control or indicating purposes, just as the rotation of the shaft of the angle of attack servo 44 is utilized in the system of Fig. 2 for creation of an electrical output signal.

A physical embodiment of the system of Fig. 5 has not been illustrated in the drawings as it would differ only in number of units from that shown in Figs. 3 and 4. It requires three more positioners with their associated amplifiers, two additional transducers, and the inclusion of additional components in the adapter unit.

The invention has now been described with reference to two embodiments thereof. Obviously various changes in the particular systems described and illustrated for electromechanically obtaining flight data from measurable quantities could be made without departing from the spirit of the invention or the scope of the accompanying claims.

I claim:

1. Apparatus for electromechanically obtaining flight data from measurable quantities which comprises transducing means for converting continuous measurements of factors affecting the flight of an aircraft into correspondingly varying voltages, at least one servo unit comprising an amplifier, motor and shaft, at least one potentiometer having a wiper mechanically coupled to said shaft for movement therewith, means for impressing one of said varying voltages across said potentiometer, and means for impressing upon the amplifier of said servo unit at least one other of said varying voltages and the fraction of the voltage across said potentiometer determined by the position of the wiper whereby the position of the shaft of said unit is a function of the ratio of two of the measured quantities.

2. Apparatus according to claim 1 including a second servo unit comprising an amplifier, motor and shaft, a second potentiometer having a wiper mechanically coupled to the shaft of said second unit, a source of constant voltage connected across said second potentiometer, and means for impressing on the amplifier of said second servo unit the algebraic sum of one of said varying voltages and the fraction of the voltage across said second potentiometer determined by the position of the wiper thereof whereby the position of the shaft of said second unit is a function of one measured quantity.

3. Apparatus for electromechanically obtaining angle of attack of an aircraft from measurable quantities which comprises a first transducer for continuously converting measured static pressure to a correspondingly varying voltage, a second transducer for continuously converting measured difference in total and static pressures to a correspondingly varying voltage, a third transducer for continuously converting measured normal acceleration of the aircraft to a correspondingly varying voltage, a network correlated to the ratio of the weight of the aircraft and its load to the surface area of the wings, means for impressing the voltage varying with the normal acceleration of the aircraft across said network, a Mach number servo unit responsive to said first two varying voltages for converting the ratio thereof to a shaft rotation, a potentiometer connected across a part of said network and having a wiper controlled by the shaft rotation of said Mach number servo unit, a source of constant voltage, a potentiometer energized from said source and having a wiper, a second source of constant voltage, a potentiometer energized from said second source and having a wiper, an angle of attack servo unit for converting voltages impressed thereon to a shaft rotation, the wiper of one of said last mentioned potentiometers being mechanically controlled by the shaft rotation of said angle of attack servo unit, the wiper of the other of said last mentioned potentiometers being mechanically controlled by the shaft rotation of said Mach number servo unit, a pressure servo unit for converting one of said first two varying voltages into a shaft rotation, and means for impressing upon said angle of attack servo unit the fractional voltage across said first potentiometer determined by the position of the wiper thereof and a bucking voltage comprising the product of a voltage controlled by the shaft rotation of said pressure servo unit and a voltage equal to the fractional voltage across the potentiometer the wiper of which is controlled by said angle of attack servo unit less the fractional voltage across the potentiometer the wiper of which is controlled by the shaft rotation of said Mach number servo unit, the angle of attack being given in terms of shaft rotation of said angle of attack servo unit.

4. Apparatus for solving an aerodynamic equation for angle of attack containing terms dependent on Mach number, normal acceleration of an aircraft, pressures acting on the aircraft and the ratio of weight of aircraft and load to wing, which comprises a plurality of transducers for converting measured pressures and acceleration into correspondingly varying voltages, servo units for converting certain of said voltages singly and in combination into shaft rotations indicative of Mach number and pressures, potentiometers having wipers controlled by the shaft rotations of said servo units, at least one of said potentiometers being designed with reference to Mach number for yielding at its wiper a voltage varying with a term of the equation, a network correlated to the ratio of the weight of the aircraft and load to wing area, means for energizing said network by the voltage varying with the normal acceleration of the aircraft, one of said potentiometers being connected across a part of said network, and an output servo unit for yielding angle of attack in terms of shaft rotation, a source of constant voltage, a potentiometer connected across said source and having a wiper controlled by the shaft rotation of said output servo unit, and means for combining in accordance with the aerodynamic equation the voltages appearing at the wipers of said potentiometers with that at the wiper of said last potentiometer for delivery to said output servo unit.

5. Apparatus according to claim 4 including means responsive to a predetermined reduction in load of the aircraft for reducing the part of the network across which a potentiometer is connected.

6. Apparatus according to claim 4 wherein a second potentiometer is designed with reference to Mach number for yielding at its wiper a voltage varying with a term of the equation, one of said two designed potentiometers being that connected across a part of said network.

7. Apparatus according to claim 4 wherein the equation to be solved includes two terms involving normal acceleration of the aircraft, one of which also involves a function of Mach number, and wherein a voltage corresponding to the term involving both normal acceleration and a function of Mach number is obtained from the wiper of the potentiometer connected across a part of said network and a voltage corresponding to the other term involving normal acceleration is obtained from said part of the network whereby a correction for aeroelastic deformation of the wings of the aircraft is included in the solution for angle of attack.

8. Apparatus according to claim 4 including an output network comprising a plurality of series connected resistance elements, a source of excitation voltage therefor, a potentiometer connected across said output network and having a wiper controlled by the shaft rotation of said output servo unit and a pair of output terminals, one connected to the wiper of said last mentioned potentiometer and the other adjustably connected to said output network whereby the output signal can be adjusted to correct for design features of the aircraft or load.

9. Apparatus according to claim 4 including an output network comprising a plurality of series connected resistance elements, a source of excitation voltage therefor, a potentiometer connected across said output network and having a wiper controlled by the shaft rotation of said output servo unit and a pair of output terminals, one connected to the wiper of said last mentioned potentiometer and the other adjustably connected to said output network whereby the output signal can be adjusted to correct for design features of the aircraft or load and wherein said first mentioned network and said output network are contained in a separately packaged adapter unit whereby, by substitution of different adapter units, the apparatus may be correlated to airplanes of different weight and design.

10. Apparatus for electromechanically obtaining Mach number and angle of attack of an airplane from measurable quantities which comprises transducing means for converting continuous measurement of static pressure, of the difference between the total pressure and static pressure and of normal acceleration of an airplane into first, second and third voltages, a first servo unit including an amplifier, motor and shaft, a first potentiometer having a wiper positioned by said shaft, means for impressing said first voltage across said potentiometer, means for impressing upon the amplifier of said servo unit said second voltage and the fraction of the voltage across said potentiometer determined by the position of the wiper whereby the position of said shaft is a function of Mach number; a second servo unit comprising an amplifier, motor and shaft, a second potentiometer having a wiper positioned by the shaft of said first servo unit, means for impressing across said second potentiometer said third voltage, means responsive to said second voltage and to the positions of said shafts for creating a fourth voltage, and means for impressing said fourth voltage and the fraction of the third voltage appearing at the wiper of said second potentiometer upon the amplifier of said second servo unit to yield angle of attack in terms of the shaft rotation of said second servo unit.

11. Apparatus for electromechanically obtaining Mach number and true air speed of an airplane from measurable quantities which comprises transducing means for converting continuous measurements of static pressure, of the difference between the total pressure and the static pressure and of the temperature of the air stream into first, second and third voltages, a first servo unit comprising an amplifier, motor and shaft, a potentiometer having a wiper positioned by said shaft, means for impressing said first voltage across said potentiometer, means for impressing upon the amplifier of said servo unit said second voltage and the fraction of the voltage across said potentiometer determined by the position of the wiper whereby the position of said shaft is a function of Mach number, a second servo unit comprising an amplifier, motor and shaft, a second potentiometer having a wiper positioned by the shaft of said first servo unit, means for impressing said third voltage across said second potentiometer and means for impressing the fraction of the third voltage determined by the position of the wiper thereon and a voltage varying with the position of the shaft of said second servo unit upon the amplifier of said second servo unit whereby the position of the shaft of said second servo unit is a function of true air speed.

References Cited in the file of this patent

UNITED STATES PATENTS

| | | |
|---|---|---|
| 2,270,991 | Bagno | Jan. 27, 1942 |
| 2,318,153 | Gibson | May 4, 1943 |
| 2,457,287 | Townes | Dec. 28, 1948 |
| 2,488,372 | Breisch | Nov. 15, 1949 |
| 2,512,278 | Jones | June 20, 1950 |
| 2,515,638 | Doucette | July 18, 1950 |
| 2,574,656 | Peterson | Nov. 13, 1951 |

FOREIGN PATENTS

| | | |
|---|---|---|
| 486,666 | Great Britain | June 8, 1938 |